United States Patent
Chen (10) Patent No.: US 10,708,267 B2
(45) Date of Patent: Jul. 7, 2020

(54) METHOD AND ASSOCIATED PROCESSOR FOR AUTHENTICATION

(71) Applicant: MEDIATEK Inc., Hsin-Chu (TW)

(72) Inventor: Jing-Fu Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 141 days.

(21) Appl. No.: 15/653,607

(22) Filed: Jul. 19, 2017

(65) Prior Publication Data
US 2019/0028474 A1    Jan. 24, 2019

(51) Int. Cl.
| | | |
|---|---|---|
| G06F 21/00 | (2013.01) | |
| H04L 29/06 | (2006.01) | |
| H04W 12/06 | (2009.01) | |
| G06F 21/35 | (2013.01) | |
| H04W 12/04 | (2009.01) | |
| G06F 21/41 | (2013.01) | |
| H04W 12/00 | (2009.01) | |

(52) U.S. Cl.
CPC .......... *H04L 63/0884* (2013.01); *G06F 21/35* (2013.01); *G06F 21/41* (2013.01); *H04L 63/08* (2013.01); *H04L 63/10* (2013.01); *H04W 12/003* (2019.01); *H04W 12/04* (2013.01); *H04W 12/06* (2013.01); *H04L 63/14* (2013.01); *H04L 2463/082* (2013.01)

(58) Field of Classification Search
CPC .................................................. H04L 63/0884
See application file for complete search history.

(56) References Cited

U.S. PATENT DOCUMENTS

| | | | | |
|---|---|---|---|---|
| 8,607,306 | B1 * | 12/2013 | Bridge | H04L 63/068 726/1 |
| 8,813,200 | B2 | 8/2014 | Zagni | |
| 2003/0195802 | A1 * | 10/2003 | Hensen | G06Q 30/02 705/14.4 |
| 2008/0171534 | A1 * | 7/2008 | Holtmanns | H04L 63/08 455/411 |
| 2011/0078239 | A1 * | 3/2011 | Heen | G06F 8/65 709/203 |
| 2011/0289315 | A1 * | 11/2011 | Laitinen | G06F 21/575 713/156 |
| 2012/0222091 | A1 * | 8/2012 | Castellanos Zamora | H04L 63/08 726/3 |

\* cited by examiner

*Primary Examiner* — Josnel Jeudy
(74) *Attorney, Agent, or Firm* — McClure, Qualey & Rodack, LLP (57) ABSTRACT

The present invention provides method and associated processor for authentication, e.g., log-in, with a remote application server by the processor of a user equipment, including: by the processor, achieving a bootstrapping authorization with a remote operator, obtaining a username and a password for logging in the remote application server according to the bootstrapping authorization, composing a log-in message according to the username and the password, and sending the log-in message to the remote application server.

16 Claims, 4 Drawing Sheets

GET /dir/index.html HTTP/1.0
Host: localhost

FIG. 3a

HTTP/1.0 401 unauthorized
server: HTTPd/0 .9
Date: Sun, 10 Apr 2014 20:26:47 GMT
WWW-Authenticate: Digest realm="testrealm@host.com",
                         qop="auth, auth-int",
                         nonce="dcd98b7102dd2f0e8b11d0f600bfb0c093",
                         opaque="5ccc069c403ebaf9f0171e9517f40e41"

FIG. 3b

GET /dir/index.html HTTP/1 .0
Host : localhost
Authorization: Digest username="Mufasa", ⟵302
            realm="testrealm@host.com", ⟵304
            nonce="dcd98b7102dd2f0e8b11d0f600bfb0c093", ⟵306
            uri="/dir/index.html", ⟵308
            qop=auth, ⟵310
            nc=00000001, ⟵312
            cnonce="0a4f113b", ⟵314
            response="6629fae49393a05397450978507c4ef1", ⟵316
            opaque="5ccc069C403ebaf9f0171e9517f40e41"

FIG. 3c

330 — HA1 = MD5( "Mufasa:testrealm@host.com:Circle of Life" )  ⎴318
          = 939e7578ed9e3c518a452acee763bce9

340 — HA2 = MD5( "GET:/dir/index.html" )  ⎴320
          = 39aff3a2bab6126f332b942af96d3366

350 — string of "response" field = MD5( "939e7578ed9e3c518a452acee763bce9:\  ⎴322
                                  dcd98b7102dd2f0e8b11d0f6e0bfb0c093:\
                                  00000001:0a4f113b:auth:\
                                  39aff3a2bab6126f332b942af96d3366" )
                              = 6629fae49393a05397450978S07c4ef1
                                                              ⎵316

FIG. 3d

# METHOD AND ASSOCIATED PROCESSOR FOR AUTHENTICATION

FIELD OF THE INVENTION

The present invention relates to method and associated processor for authentication, and more particularly, to method and associated processor of a user equipment enabling the processor to perform authentication (e.g., log-in) with a remote application server by leveraging bootstrapping of a remote operator.

BACKGROUND OF THE INVENTION

Modern life has been enriched and facilitated by various network services, such as social networking services, messenger services, real-time chatting services, on-line shopping, trading and/or bidding services, mail services, calendar and scheduling services, media streaming services, news broadcasting and/or feeding services, forum services, gaming services, cloud storage and/or file sharing services, search engine services, knowledge management and/or learning services, on-line payment, financial and/or banking services, language translation services, monitoring and surveillance services, anti-virus services, locating and navigating services, as well as public government services. As a network service is implemented by a remote application server, a user utilizes a user equipment to communicate with the application server; for example, the user equipment may be a mobile phone, a tablet, a wearable device, etc.

Because network service may be personalized and customized respectively for different users, a user may need to be authenticated by an application server to be identified, and then be allowed to access one's own personalized network service provided by the application server. Prior art for a user to be authenticated by an application server requires the user to log in by manually inputting a username (user identity) and a password, which are embedded in a log-in request message and sent to the application server by a user equipment of the user.

However, as each one of various network services requires a username-password set, a user needs many username-password sets respectively for many network services. It is difficult, inconvenient and infeasible for a user to remember many username-password sets. A user may choose to use a same username-password set for all network services, but will suffer potential security issues; for example, if one of the network services is compromised to leak the username-password set, personal information of all other network services are exposed to malicious eavesdropper. A user may choose to write down or record the username-password sets on paper or in user equipment, but it still has potential security issues, such as peeking.

SUMMARY OF THE INVENTION

An object of the invention is providing a processor (e.g., 140 in FIG. 1) for a user equipment (e.g., 100). The processor may comprise an interface circuit (e.g., 144) and a processing unit (e.g., 142) coupled to the interface circuit. The processing unit may be arranged to achieve a bootstrapping authorization with a remote operator (e.g., 104) via the interface circuit, obtain a username and a password for logging in a remote application server (e.g., 102) according to the bootstrapping authorization (e.g., 110), compose a log-in message (e.g., 220 in FIG. 2) according to the username and the password, and send the log-in message (e.g., 222) to the remote application server via the interface circuit.

In an embodiment, the processing unit may be further arranged to request access (e.g., 202) to the remote application server via the interface circuit, and receive a challenge for bootstrapping (e.g., 204) from the remote application server via the interface circuit; wherein the processing unit may be arranged to achieve the bootstrapping authorization after receiving the challenge for bootstrapping.

In an embodiment, the processing unit may be arranged to achieve the bootstrapping authorization by sending an authentication request (e.g., 206) to the remote operator via the interface, receiving an unauthorized response from the remote operator via the interface circuit, and composing an authorization request (e.g., 212) according to the unauthorized response, sending the authorization request (e.g., 214) to the remote operator via the interface circuit, and receiving a bootstrapping granting response (e.g., 218) from the remote operator via the interface circuit. The processing unit may further be arranged to compose the authorization request (e.g., 212) by deriving a bootstrapping response according to the unauthorized response, and including the bootstrapping response in a digest of the authorization request. In an embodiment, the bootstrapping granting response (e.g., 218) may include a lifetime value and a bootstrapping identifier (e.g., B-TID), and the processing unit may be arranged to obtain the username according to the bootstrapping identifier. In an embodiment, the processing unit may be arranged to obtain the password according to the bootstrapping granting response.

In an embodiment, the bootstrapping authorization may result in a bootstrapping identifier and a bootstrapping key, and the processing unit may be arranged to obtain the username according to the bootstrapping identifier, and obtain the password according to the bootstrapping key. In an embodiment, the processing unit may be arranged to obtain the username and the password without user intervention. In an embodiment, the remote operator and the remote application server are of different IP (Internet Protocol) addresses. In an embodiment, the processing unit may be arranged to compose the log-in message without user intervention.

An object of the invention is providing a method (e.g., 200) for authentication with a remote application server by a processor of a user equipment. The method may comprise: by the processor, initializing an access attempt to the remote application server, achieving a bootstrapping authorization with a remote operator, obtaining a username and a password for logging in the remote application server according to the bootstrapping authorization (e.g., 110 in FIG. 1), composing (e.g., 220) a log-in message according to the username and the password, and sending the log-in message (e.g., 222) to the remote application server for the remote application server to verify log-in of the user equipment by comparing an expected log-in response and a received log-in response included in the log-in message, wherein the expected log-in response is obtained according to communication (e.g., 224 and 226) between the remote application server and the remote operator. In an embodiment, initializing the access attempt to the remote application server may comprise: by the processor, requesting access (e.g., 202) to the remote application server, and receiving a challenge (e.g., 204) for bootstrapping from the remote application server.

An object of the invention is providing a method (e.g., 200) for a network system (e.g., 10 in FIG. 1) which may comprise a user equipment, a remote operator and a remote application server. The method may comprise: by the user equipment, requesting access (e.g., 202 in FIG. 2) to the remote application server; by the remote application server, sending a challenge for bootstrapping (e.g., 204) to the user equipment; by the user equipment, achieving a bootstrapping authorization with a remote operator and obtaining a username and a password according to the bootstrapping authorization (e.g., 110 in FIG. 1) for logging in the remote application server; composing a log-in message (e.g., 220) according to the username and the password; and sending the log-in message (e.g., 222) to the remote application server.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
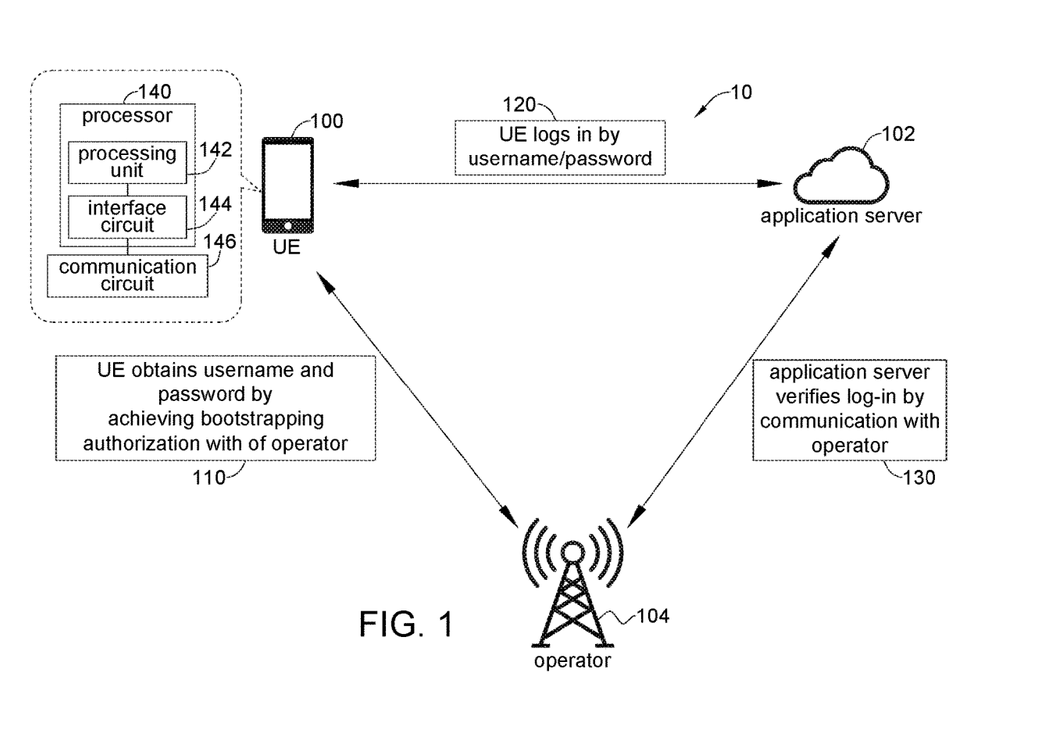
FIG. 1 illustrates an overview according to an embodiment of the invention, for enabling a user equipment to log in a remote application server by leveraging bootstrapping of a remote operator.

Please refer to FIG. 1 illustrates an overview of a flowchart applied to a network system 10 which may include a user equipment (UE) 100, a remote application server 102 and an operator 104, such that the user equipment 100 may log in the application server 102 by leveraging bootstrapping achieved with the operator 104. Logging in the application server 102 may be performed automatically. Logging in the application server 102 may be performed without user intervention. The user equipment 100 may include a processor 140 and a communication circuit 146; the processor 140 may include a processing unit 142 for executing firmware and/or software, and an interface circuit 144 bridging between the processing unit 142 and the communication circuit 146. For example, the user equipment 100 may be a mobile phone, a wearable gadget (wrest watch, glasses, headset, etc.), a tablet computer, a hand-held computer or a portable computer with telecommunication capability, wherein the processing unit 142 may be implemented by logic circuitry, the interface circuit 144 may be implemented by input/output signaling circuitry, and the communication circuit 146 may include (not shown) antenna(s), impedance matching circuitry, mixer(s) and converter(s) for converting between analog and digital.

The application server 102 may be a provider of a network service. The operator 104 may be a mobile network operator which owns or controls access to a radio spectrum license from a regulatory or government entity, also owns or controls elements of a network infrastructure necessary to provide telecommunication services to subscribers (users) over the licensed spectrum. The user equipment 100 may be identified by the operator 104 as being owned by a subscribed user of the operator 104. For example, the user equipment 100 may include a hardware or virtual SIM (subscriber identification module) for recording secret information (e.g., subscriber key) which is shared with the operator 104 but not exposed to user. On the other hand, the application server 102 and the operator 104 may be of different IP (Internet Protocol) addresses; for example, the application server 102 and the operator 104 may be distinguished by their IP addresses.

As shown in FIG. 1, when user of the user equipment 100 wants to log in the application server 102, the user equipment 100 may start a step 110 to achieve a bootstrapping authorization with the operator 104, and, according to the bootstrapping authorization, obtain a username and a password for logging in the application server 102. Achieving the bootstrapping authorization with the operator 104 and obtaining the username and the password for logging in the application server 102 may be performed automatically. Achieving the bootstrapping authorization with the operator 104 and obtaining the username and the password for logging in the application server 102 may be performed without user intervention. In a subsequent step 120, the user equipment 100 may log in the application server 102 by the obtained username and password; for example, the user equipment 100 may compose a log-in message according to the username and the password of step 110; and send the log-in message to the application server 102. Logging in the application server 102 may be performed automatically. Logging in the application server 102 may be performed without user intervention. Then, in a step 130, the remote application server 102 may identify and verify log-in of the user equipment 100 by communication with the operator 104, e.g., by obtaining an expected log-in response according to communication between the operator 104 and the application server 102, and comparing the expected log-in response and a received log-in response included in the log-in message sent from the user equipment 100. If the received log-in response matches the expected log-in response, the user equipment 100 may be authenticated by the application server 102 to access network service. The network service may be personalized for user of the user equipment 100.

Figure 2:
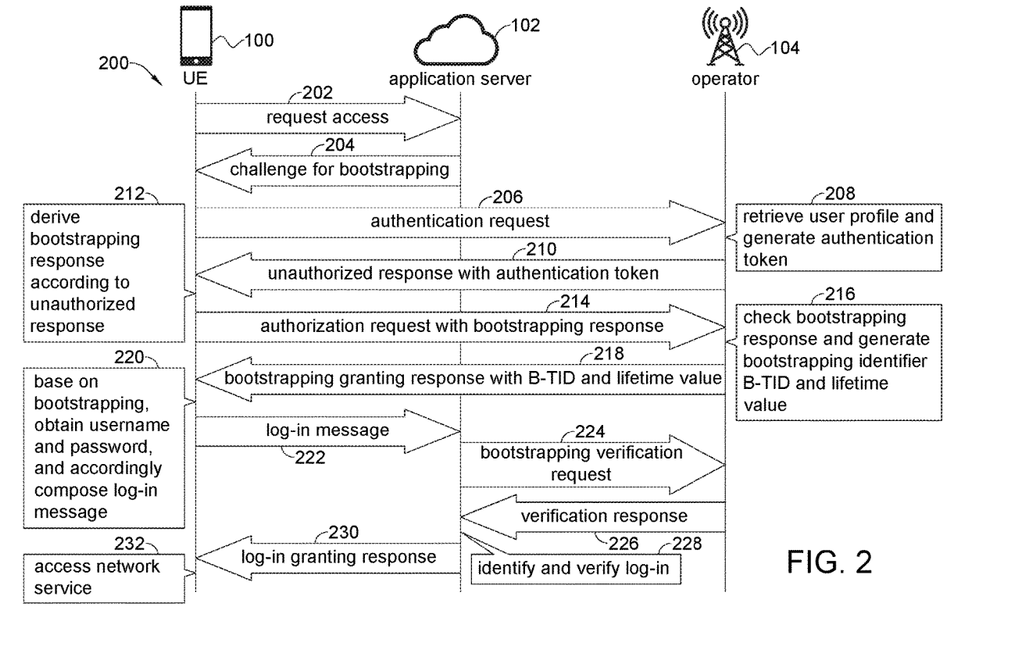
FIG. 2 illustrates a flowchart according to an embodiment of the invention.

Along with FIG. 1, please refer to FIG. 2 illustrating a flowchart 200 according to an embodiment of the invention, for the network system 10 to implement steps 110, 120 and 130 shown in FIG. 1. Major steps of the flowchart 200 may be described as follows.

Figure 3A:
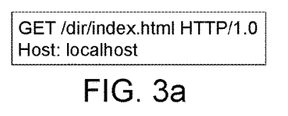
FIGS. 3a-3c demonstrate exemplary messages for a user equipment to log in a remote application server.

Step 202: when user of the user equipment 100 wants to log in the application server 102, the processing unit 142 (FIG. 1) may request access to the remote application server via the interface circuit 144 and the communication circuit 146. For example, the processing unit 142 may request access by sending an HTTP (Hypertext Transfer Protocol) request message to the application server 102, wherein the HTTP request message may start with a "GET" request line, as shown in FIG. 3a.

Figure 3B:
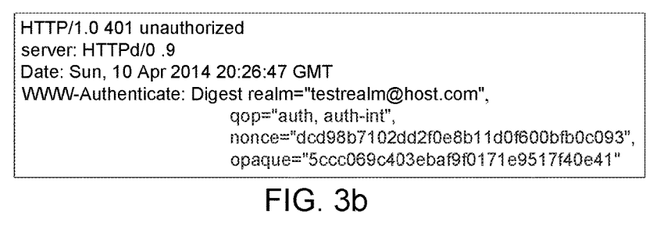

Step 204: in response to the request from the user equipment 100, the application server 102 may send back a challenge for bootstrapping. The challenge for bootstrapping may request the user equipment 100 to leveraging bootstrapping for log-in. For example, the challenge may be an HTTP response message including a header section which may start with a status code "401" for "unauthorized," as shown in FIG. 3b. The processing unit 142 may receive the challenge for bootstrapping from the application server 102 via the interface circuit 144 and the communication circuit 146, and proceed to step 206.

Step 206: after receiving the challenge for bootstrapping, the processing unit 142 may start to achieve a bootstrapping authorization with the operator 104 by first sending an authentication request to the operator 104 via the interface circuit 144 and the communication circuit 146. For example, the authentication request may be an HTTP message which may start with a "GET" request line, and include a header field "authorization" and associated information for the operator 104 to identify the user equipment 100.

Step 208: the operator 104 may identify user of the user equipment 100 according to the authentication request of step 206, retrieve corresponding personal user profile, and accordingly generate an authentication token.

Step 210: the operator 104 may send an unauthorized response to the user equipment 100, wherein the unauthorized response may include the authentication token generated in step 208. For example, the unauthorized response may be an HTTP message with a status code "401" for "unauthorized," and include a header field "WWW-authenticate," with the authentication token being embedded in a string of a "nonce" field. The authentication token may be a string of multiple characters and may include letters (e.g., "a" to "z") and/or numbers (e.g., "0" to "9").

Step 212: the processing unit 142 may receive the unauthorized response from the operator 104 via the interface circuit 144 and the communication circuit 146, and compose an authorization request according to the unauthorized response. In an embodiment, the processing unit 142 may verify that the operator 104 is a trustable and designated provider of bootstrapping by checking the authentication token, and then compose the authorization request by deriving a bootstrapping response according to the unauthorized response, and including the bootstrapping response in a digest of the authorization request.

For example, the string of the "nonce" field in the unauthorized response sent by the operator 104 may include two concatenated first partial string and second partial string, the processing unit 142 may extract the second partial string as the authentication token, and derive the bootstrapping response by extracting the first partial string, and applying the first partial string and a subscriber key as two inputs to an authentication and key generation function "f2" described in 3GPP TS 35.206. The authorization request composed by the processing unit 142 may be an HTTP message which may start with a "GET" request line, and include a header field "authorization" followed by the bootstrapping response as a string of a "response" field.

Step 214: the processing unit 142 may send the authorization request to the operator 104 via the interface circuit 144 and the communication circuit 146.

Step 216: the operator 104 may receive the authorization request, and check if the bootstrapping response included in the authorization request matches an expected response calculated by the operator 104 itself. If the two responses match, the operator 104 may generate a bootstrapping identifier B-TID and a lifetime value, and proceed to step 218. For example, the bootstrapping identifier B-TID may be a string of multiple characters, and the lifetime value may indicate how long the bootstrapping remains effective.

Step 218: the operator 104 may sent a bootstrapping granting response to the user equipment 100. For example, the bootstrapping granting response may be an HTTP message with a status code "200" for "OK," and include a payload recording the bootstrapping identifier B-TID and the lifetime value.

Step 220: the processing unit 142 may receive the bootstrapping granting response from the operator 104 via the interface circuit 144 and the communication circuit 146. By communication in steps 206, 210, 214 and 218, the processing unit 142 may achieve a bootstrapping authorization with the operator 104. According to the bootstrapping authorization, the processing unit 142 may obtain a username and a password for logging in the application server 102. Obtaining the username and the password may be performed automatically. Obtaining the username and the password may be performed without user intervention. For example, the bootstrapping authorization may result in the bootstrapping identifier B-TID (step 216) and a bootstrapping key, and the processing unit 142 may obtain a username according to the bootstrapping identifier B-TID, and obtain the password according to the bootstrapping key. The bootstrapping key may be calculated by, for example, including a subscriber key, which may identify the UE 100, as an input to a key derivation function. In an embodiment, the processing unit 142 may calculate the password by applying the authentication token (steps 208 and 210) and the subscriber key to a hash function. Then the processing unit 142 may compose a log-in message according to the username and the password.

Figure 3C:
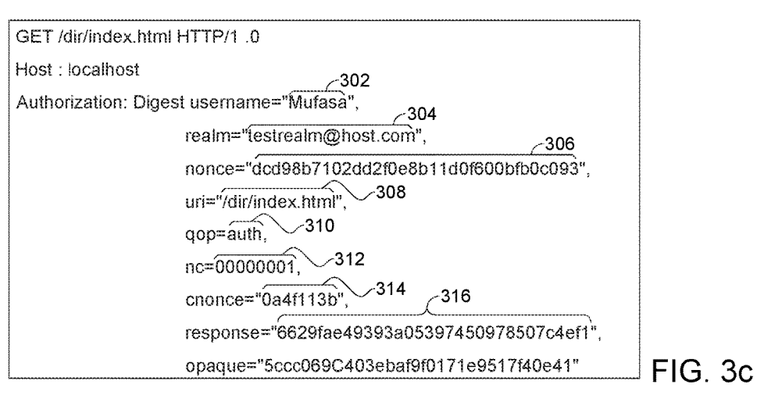
Figure 3D:
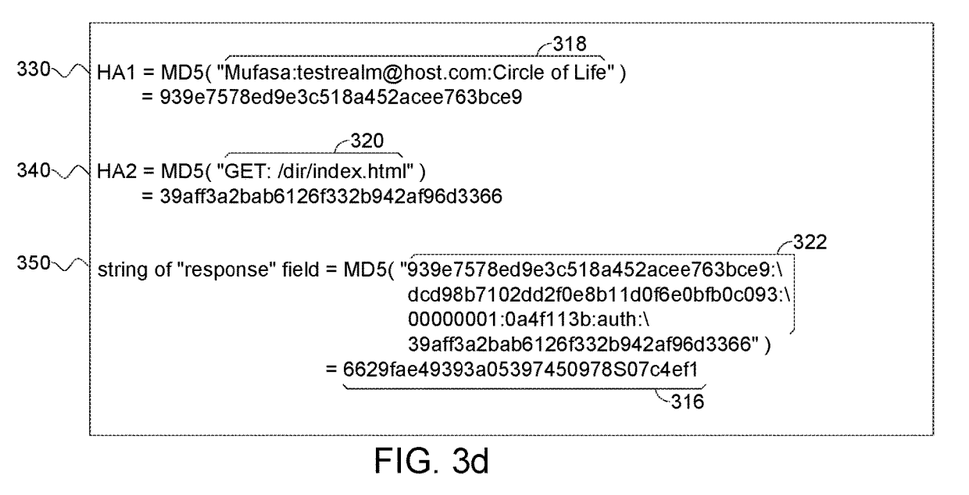
FIG. 3d illustrates a procedure to calculate a log-in response associated with the message in FIG. 3c.

For example, as shown in FIG. 3c, the log-in message may be an HTTP message including a header section which may start with a "GET" request line, followed by a header field "authorization", a user identifying string 302 of a "username" field, a realm string 304 of a "realm" field, a nonce string 306 of a "nonce" field, a resource identifier string 308 of a "uri" field, a protection quality indication string 310 of a "qop" field, a string 312 of a "nc" field, a cnonce string 314 of a "cnonce" field, and a log-in response string 316 of a "response" field. The strings 304, 306 and 310 may be obtained from the challenge for bootstrapping (step 204 and FIG. 3b). According to an embodiment of the invention, the bootstrapping identifier B-TID may be utilized as the user identifying string 302, and the log-in response string 316 may be calculated according to the bootstrapping key which may be utilized as the password. For example, as shown in FIG. 3d, the processing unit 142 may calculate the log-in response string 316 of the "response" field by: in step 330, concatenating the strings 302, 304 and the password ("Circle of Life" in this example) to form a first input string 318, and applying the first input string 318 to an MD5 function (hash function) to calculate a first output string HA1; in step 340, concatenating a command string "GET:" and the string 308 to form a second input string 320, and applying the second input string 320 to the MD5 function to calculate a second output string HA2; and, in step 350, concatenating the strings HA1, 306, 312, 314, 310 and HA2 to form a third input string 322, and applying the third input string 322 to the MD5 function. In other words, in an embodiment, the log-in response string 316 may result from the password, while the password may result from the authentication token and the subscriber key of the UE 100.

As aforementioned, the bootstrapping key utilized to obtain the password may result from the bootstrapping authorization achieved by steps 206, 208, 210, 212, 214, 216 and 218. In an embodiment, the processing unit 142 may (e.g., in step 212) calculate a key Ks as the bootstrapping key according to the unauthorized response of step 210. For example, the processing unit 142 may calculate the key Ks by applying the first partial string (as mentioned in step 212) and the subscriber key as two inputs to an authentication and key generation function "f3" described in 3GPP TS 35.206 to calculate a cipher key CK (not shown), applying the first partial string and the subscriber key as two inputs to an authentication and key generation function "f4" described in 3GPP TS 35.206 to calculate an integrity key IK (not shown), and concatenating the keys CK and IK. In an embodiment, the key Ks may be calculated by the operator 104, and be included in the granting response of step 218 to be sent to the user equipment 100.

In an embodiment, the processing unit 142 may calculate a key Ks_NAF as the bootstrapping key according to the unauthorized response of step 210. For example, the processing unit 142 may (e.g., in step 212) calculate the key Ks_NAF by applying the key Ks, the first partial string (as mentioned in step 212) and an identifier NAF_Id (not shown) as inputs to a key derivation function (KDF) described in 3GPP2 S.S0109, wherein the identifier NAF_Id is used to identify the application server 102. In an embodiment, the key Ks_NAF may be calculated by the operator 104, and be included in the granting response of step 218 to be sent to the user equipment 100.

By steps 206, 208, 210, 212, 214, 216, 218 and 220, step 110 in FIG. 1 may be implemented. Then the processing unit 142 may proceed to step 222.

Step 222: the processing unit 142 may send the log-in message to the application server 102 via the interface circuit 144 and the communication circuit 146. By step 222, step 120 in FIG. 1 may be implemented.

Step 224: according to the log-in message of step 222, the application server 102 may send a bootstrapping verification request to the operator 104. For example, the bootstrapping verification request may include the bootstrapping identifier B-TID.

Step 226: according to the bootstrapping identifier B-TID included in the bootstrapping verification request of step 224, the operator 104 may find the accompanying bootstrapping key, and identify the user equipment 100 which earlier achieves the bootstrapping authorization with the operator 104. Then the operator 104 may include identification of the user equipment 100 and the bootstrapping key in a verification response, and send the verification response to the application server 102.

Step 228: according to the verification response of step 226, the application server 102 may identify and verify log-in of the user equipment 100. To verify the log-in attempt of the log-in message of step 222, the application server 102 may calculate an expected log-in response according to a password obtained from the bootstrapping key included in the verification response of step 226, and then compare the expected log-in response and a received log-in response (e.g., the log-in response string 316) included in the log-in message of step 222. For example, the application server 102 may calculate the expected log-in response according to steps 330, 340 and 350 in FIG. 3d, with the string 318 in step 330 determined according to the bootstrapping key received from the operator 104 (step 226). In other words, the expected log-in response is obtained according to communication between the application server 102 and the operator 104, e.g., the bootstrapping verification request of step 224 and the verification response of step 226.

If the expected log-in response calculated according to communication of steps 224 and 226 matches the log-in response received from the log-in message of step 222, the application server 102 may proceed to step 230. By steps 224, 226 and 228, step 130 in FIG. 1 may be implemented.

Step 230: the application server 102 may transmit a log-in granting response to the user equipment 100. For example, the log-in granting response may be an HTTP message with a status code "200" for "OK."

Step 232: the processing unit 142 may receive the log-in granting response of step 230 from the application server 102 via the interface circuit 144 and the communication circuit 146, and then proceed to access network service(s) provided by the application server 102. The network service(s) may be personalized.

In an embodiment, the bootstrapping key and/or the bootstrapping identifier B-TID may be generated by leveraging random number(s), and the username and/or password obtained according to the bootstrapping key and the bootstrapping identifier B-TID may therefore be more secure, e.g., be more infeasible to be compromised by exhaustive brute-force search. As aforementioned, in an embodiment, the bootstrapping identifier and the bootstrapping key resulting from the bootstrapping authorization between the user equipment 100 and the operator 104 may be respectively utilized as a username and a password for logging in the application server 102. In a different embodiment, the user equipment 100 and the application server 102 may derive the username and/or the password by applying the bootstrapping key and/or the bootstrapping identifier (and/or the lifetime value) as input(s) to a predetermined generation function (e.g., a hash function), thus the bootstrapping key and/or the bootstrapping identifier may not need to be directly utilized as the password and/or the username.

After step 230, during communication (transactions) between the user equipment 100 and the application server 102, the user equipment 100 and/or the application server 102 may keep monitoring if a current time exceeds the lifetime value (step 216). If the current time does exceed the lifetime value, the user equipment 100 may repeat step 206 to start a new bootstrapping authorization with the operator 104 by steps 208, 210, 212, 214, 216 and 218, and therefore obtain renewed bootstrapping key, bootstrapping identifier B-TID and lifetime value. Repeating step 206 may be performed automatically. Repeating step 206 may be performed without user intervention. Then the user equipment 100 may repeat step 220 and 222 to renew the username and/or password according to the renewed bootstrapping identifier B-TID and/or bootstrapping key, and log in the application server 102 by the renewed username and password. In response, the application server 102 may repeat step 224 to obtain the renewed bootstrapping key from the operator 104 by repeated step 226, and then renew log-in verification of the user equipment 100 by repeating step 228. In other words, the username and/or password obtained by leveraging bootstrapping may be dynamic and time-varying, and therefore be more secure, e.g., be more infeasible to be compromised by replay attack.

It is noted that one or more steps of the flowchart 200 in FIG. 2 may be executed automatically, without user intervention. In some embodiments, all steps of the flowchart 200 in FIG. 2 may be executed automatically, without user intervention. That is, according to the flowchart 200, the user equipment 100 may achieve fully automatic and user-unattended log-in of the application server 102 by leveraging bootstrapping provided by the operator 104; user of the user equipment 100 may therefore access personalized and customized network service(s) from the application server 102 directly, without manually typing in username and password. With user unaware of execution of the flowchart 200, user may quickly, directly, effortlessly and securely access personalized network services, and be freed from cumbersome and unsecure manual management of username-password sets.

To sum up, the invention provides a technique for a user equipment to perform authentication (e.g., log-in) with a remote application server by leveraging bootstrapping of a remote operator. The authentication can be performed automatically and/or without user intervention. Under bootstrapping, reliable and secure secret(s) shared between a user equipment and an operator may be extended to a third party (the application server), so the user equipment and the application server may share log-in secret(s) (e.g., username and password) by respectively communicating with the operator. The invention may allow user to directly access network services without inconvenient manual keying of username and password, free user from unsecure and disturbing management of username-password sets of different network services, and therefore enhance user experience and improve security of log-in.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A processor for a user equipment, comprising:
   an interface circuit, and
   a processing unit coupled to the interface circuit, and arranged to:
   via the interface circuit, send a first request to log in a remote application server;
   receive a challenge from the remote application server;
   after receiving the challenge, send a second request to a remote operator different from the remote application server, and receive an operator response generated by the remote operator in response to the second request; wherein the operator response includes a lifetime value and a bootstrapping identifier;
   according to the operator response, obtain a username and a password for logging in the remote application server; wherein the username is obtained according to the bootstrapping identifier;
   compose a log-in message according to the username and the password; and
   by sending the log-in message to the remote application server via the interface circuit, cause the remote application server to:
      request and receive a verification response from the remote operator;
      calculate an expected log-in response based on said verification response from the remote operator; and
      verify log-in of the user equipment by comparing the expected log-in response and a received log-in response included in said log-in message.

2. The processor of claim 1, wherein the processing unit is further arranged to:
   after receiving the challenge and before sending the second request, send an authentication request to the remote operator via the interface circuit;
   receive an unauthorized response from the remote operator via the interface circuit; and
   compose the second request according to the unauthorized response.

3. The processor of claim 2, wherein the processing unit is further arranged to compose the second request by:
   deriving a bootstrapping response according to the unauthorized response; and
   including the bootstrapping response in a digest of the second request.

4. The processor of claim 1, wherein the second request results in a bootstrapping key, and the processing unit is arranged to obtain the password according to the bootstrapping key.

5. The processor of claim 1, wherein the remote operator and the remote application server are of different IP (Internet Protocol) addresses.

6. The processor of claim 1, wherein the processing unit is arranged to obtain the username and the password without user manual intervention.

7. A method for authentication with a remote application server by a processor of a user equipment, comprising:
   by the processor, sending a first request to log in the remote application server;
   receiving a challenge from the remote application server;
   after receiving the challenge, sending a second request to a remote operator different from the remote application server, and receiving an operator response generated by the remote operator in response to the second request; wherein the operator response includes a lifetime value and a bootstrapping identifier;
   according to the operator response, obtaining a username and a password for logging in the remote application server; wherein the username is obtained according to the bootstrapping identifier;
   composing a log-in message according to the username and the password; and
   by sending the log-in message to the remote application server, causing the remote application server to:
      request and receive a verification response from the remote operator;
      calculate an expected log-in response based on said verification response from the remote operator; and
      verify log-in of the user equipment by comparing the expected log-in response and a received log-in response included in the log-in message.

8. The method of claim 7 further comprising:
   by the processor, after receiving the challenge and before sending the second request, sending an authentication request to the remote operator;
   receiving an unauthorized response from the remote operator; and
   composing the second request according to the unauthorized response.

9. The method of claim 8, wherein composing the second request comprises:
   by the processor, deriving a bootstrapping response according to the unauthorized request; and
   including the bootstrapping response in a digest of the second request.

10. The method of claim 7, wherein the second request results in a bootstrapping key, and the password is obtained according to the bootstrapping key.

11. The method of claim 7, wherein the remote operator and the remote application server are of different IP (Internet Protocol) addresses.

12. The method of claim 7, wherein the username and the password are obtained without user manual intervention.

13. A method for a network system which comprises a user equipment, a remote operator and a remote application server, and the method comprising:

by the user equipment, sending a first request to log in the remote application server;

by the remote application server, sending a challenge for bootstrapping to the user equipment;

by the user equipment, sending a second request to the remote operator after receiving the challenge; receiving an operator response generated by the remote operator in response to the second request; obtaining a username and a password according to the operator response for logging in the remote application server, wherein the operator response includes a lifetime value and a bootstrapping identifier, and the username is obtained according to the bootstrapping identifier; composing a log-in message according to the username and the password; and by sending the log-in message to the remote application server, causing the remote application server to: request and receive a verification response from the remote operator, calculate an expected log-in response based on said verification response from the remote operator, and verify log-in of the user equipment by comparing the expected log-in response and a received log-in response included in the log-in message.

14. The method of claim 13, wherein the remote operator and the remote application server are of different IP (Internet Protocol) addresses.

15. The method of claim 13, wherein the second request results in a bootstrapping key, and the password is obtained according to the bootstrapping key.

16. The method of claim 13, wherein the user equipment is arranged to obtain the username and the password without user manual intervention.

\* \* \* \* \*